Sept. 27, 1932.  H. J. BENZ  1,879,784
FLOWERPOT SUPPORT AND IRRIGATING DEVICE
Filed Jan. 10, 1931
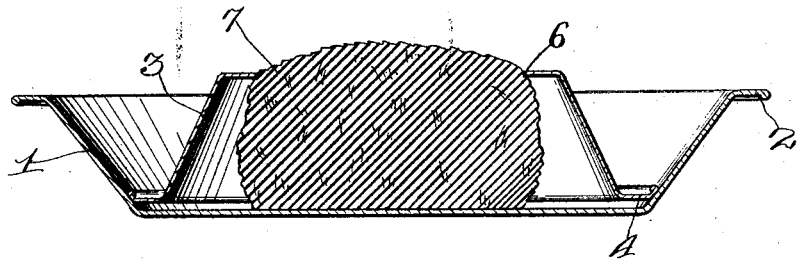
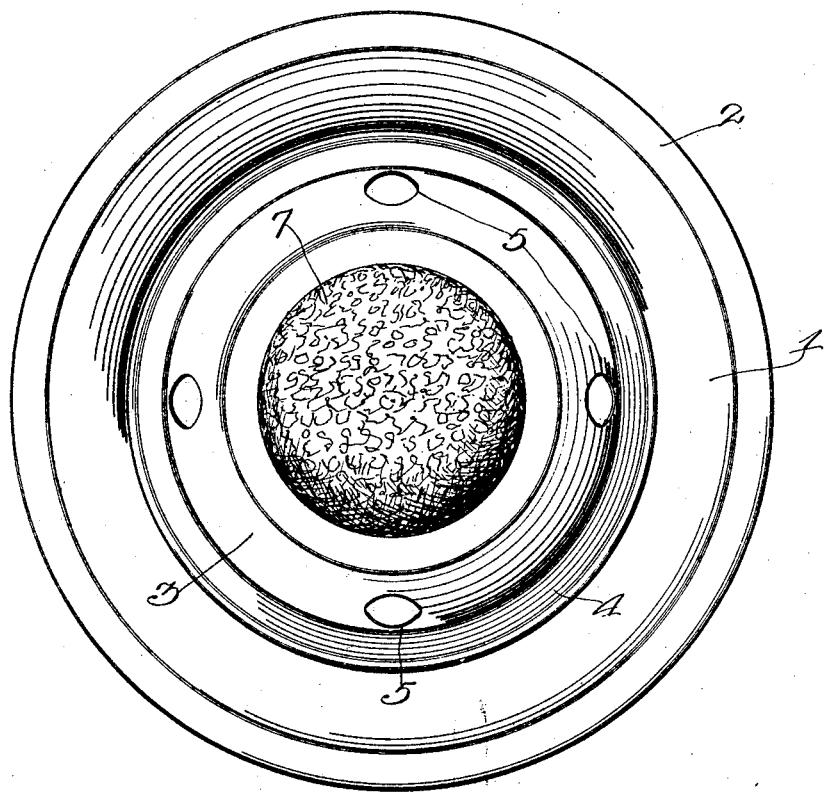
Inventor
Henry J. Benz Patented Sept. 27, 1932

1,879,784

UNITED STATES PATENT OFFICE

HENRY J. BENZ, OF RACINE, WISCONSIN

FLOWERPOT SUPPORT AND IRRIGATING DEVICE

Application filed January 10, 1931. Serial No. 507,895.

This invention relates to improvements in flower pot supports and irrigating device.

One of the objects of the present invention is the provision of a device of the above character, wherein a supporting member is provided for flower pots and the like, together with means for irrigating the plant within the pot, and also provides means for receiving any drippings or the like from the pot during the watering of the plant.

Another object of the present invention is the provision of a flower pot support and irrigating device, wherein the support is arranged within a substantially shallow pan and the support is provided with an enlarged central opening through which projects the upper portion of a sponge or similar absorbent member which normally rests upon the bottom of a shallow pan for conveying the moisture from the pan upwardly into the flower pot, so as to provide a continuous irrigation for the plant.

With the above and other objects in view, the invention consists in the novel features of construction, the combination and arrangement of parts hereinafter more fully set forth, pointed out in the claims and shown in the accompanying drawing wherein:

Figure 1 is a transverse sectional view taken through a flower support and plant irrigator constructed in accordance with my invention; and, Figure 2 is a top plan view.

Referring more particularly to the drawing, 1 indicates a comparatively shallow pan-like member provided with an annular inclined side wall having a lateral projecting annular flange 2 at the upper edge thereof. Arranged within the shallow-pan like member 1 and disposed in an inverted position is a supporting member 3 provided at its lower edge with an annular lateral flange 4 which may be soldered or otherwise secured to the inclined side wall of the pan 1 at a point adjacent the bottom of the pan, so that the flange 4 is normally spaced from the bottom of the pan as shown in Figure 1.

The side walls of the support 3 are provided with spaced openings 5 and the upper portion thereof is provided with a comparatively large opening 6 through which projects the upper portion of the sponge 7.

The sponge 7 which is used in connection with this improved device is preferably a rubber sponge which will not decay and deteriorate similar to the natural sponge, whereby this type of sponge can be removed and readily cleansed to keep the entire device in a sanitary condition which is quite beneficial to the healthy growth of the plant.

From the above, it will be apparent that the lower portion of the pot or other similar plant container can be supported upon the upper portion of the member 3, so that the usual opening in the bottom of the container will permit the absorbing of the material from the sponge 7 into the material around the roots of the plant so as to keep the plant in a thoroughly irrigated condition.

It will be noted that by using a substantially shallow-pan like member, as indicated at 1 and then using an inverted supporting member 3 which is provided with openings 5, the plate in the pot can be watered by placing the water in the pot from the top, any overflow therefrom passing downwardly into the pan 1 and when reaching a convenient height will pass through the openings 5 to be absorbed by the sponge 7.

For a continuous irrigation of the plant in the pot, the pan 1 can be filled with water so that the water will run through the openings 5 and be absorbed by the sponge 7.

Attention is directed to the fact that a supporting member 3 extends slightly above the outside edge of the pan 1 and above said flange 2, whereby when the device is used for supporting comparatively large pots, the bottom of the pot being spaced from the flange 2 providing for circulation of air beneath the bottom of the pot and into the pan 1.

Another feature which is most desirable in the construction, is the fact that the opening 6 is comparatively large which will permit the sponge 7 to be readily removed for cleansing the pan as well as the space beneath the support 3. From this construction, it will be apparent that the device can be kept in a comparatively sanitary condition at all times.

While I have shown and described the preferred embodiment of my invention, it will be apparent from the foregoing that slight changes may be made in the construction when putting the invention into practice without departing from the spirit of the same or the scope of the appended claims.

I claim:

1. A flower pot supporting and plant irrigating device comprising a main water-receiving pan, and a pot support including a side wall and a top wall received within the pan, the top wall having an enlarged opening therein occupying the greater area of said wall, the other portion of said wall acting as a retaining flange and a sponge confined between the pan and pot support and engaging the retaining flange and insertible in position through said opening, the upper face of the sponge protruding through said opening.

2. A flower pot supporting and irrigating device comprising a main water-receiving pan having a bottom wall and a flared side wall, a pot supporting member including a side wall and a top wall, the lower edge of the side wall having an outstanding flange engaging the side wall of the pan for holding the pot supporting member above the bottom wall of the pan, the top wall of the pot supporting member being provided with an enlarged opening occupying the greater area of the said top wall, and a sponge insertible through said opening, and confined between the bottom wall of the pan and the top wall of the supporting member.

In testimony that I claim the foregoing I have hereunto set my hand at Milwaukee, in the county of Milwaukee and State of Wisconsin.

HENRY J. BENZ.